United States Patent [19]

Cole, Jr.

[11] Patent Number: 5,404,339
[45] Date of Patent: Apr. 4, 1995

[54] RETRIEVER FOR A SEISMIC STREAMER CABLE

[75] Inventor: Jimmy R. Cole, Jr., Houston, Tex.

[73] Assignee: Concord Technologies Inc., Houston, Tex.

[21] Appl. No.: 201,940

[22] Filed: Feb. 25, 1994

[51] Int. Cl.⁶ .............................. G01V 1/38; H01B 7/12
[52] U.S. Cl. .................................. 367/16; 367/18
[58] Field of Search ................... 367/16–19, 367/108, 133; 181/110; 144/245

[56] References Cited

U.S. PATENT DOCUMENTS

| | | | |
|---|---|---|---|
| 3,041,021 | 6/1962 | Jaffe | 114/245 |
| 3,123,842 | 3/1964 | Oeland et al. | 367/108 |
| 3,706,294 | 12/1972 | Radford | 114/245 |
| 3,795,759 | 3/1974 | Rhyne | 114/245 |
| 3,931,608 | 1/1976 | Cole | 340/7 |
| 4,222,340 | 9/1980 | Cole | 367/16 |
| 4,541,079 | 9/1985 | Thigpen | 357/19 |
| 4,823,325 | 4/1989 | Cole, Jr. | 367/20 |
| 4,928,262 | 5/1990 | Neeley et al. | 367/16 |
| 5,105,548 | 4/1992 | Fowler | 33/356 |
| 5,224,074 | 6/1993 | Sullivan | 367/16 |

OTHER PUBLICATIONS

Digicourse Model 5011 Compass Bird, Advertisement, The Leading Edge, Sep. 1993.

*Primary Examiner*—Nelson Moskowitz
*Attorney, Agent, or Firm*—William A. Knox

[57] ABSTRACT

A marine seismic streamer cable retriever is activated promptly when the cable and its attached retriever exceed a pre-selected safe depth. In an alternative scenario, an electronics module in the cable retriever monitors the presence of through-cable communications traffic between a mother ship and the various sensors in the cable. If an interruption in communications traffic is detected, a clock starts a count-down and sends a warning to the operator aboard ship. At the end of a count-down period, absent prior operator intervention, the cable retriever is activated.

9 Claims, 5 Drawing Sheets

RETRIEVER FOR A SEISMIC STREAMER CABLE

BACKGROUND OF THE INVENTION

1. Field of the Invention

This invention relates to a combination utility module for monitoring the three-dimensional configuration of a streamer cable and for retrieving damaged cable portions in the event of a catastrophe such as that which occurs when the cable exceeds a preselected depth or is rent asunder by a passing ship.

2. Description of Related Art

In marine seismic exploration, a ship tows a long streamer cable at a desired depth such as 15–20 meters below the water surface. The streamer cable contains acoustic receivers distributed therealong at desired spaced-apart intervals. A sound source periodically generates an acoustic wavefield which propagates through the water and into the earth beneath to insonify subsurface earth layers. The wavefield is reflected from the respective earth layers back towards the water surface where the reflected seismic waves are detected by the acoustic receivers. The acoustic or seismic receivers may be hydrophones, geophones, accelerometers or combinations thereof. The receivers convert the mechanical seismic waves to electrical signals which are sent back to the ship, through suitable transmission means in the cable, for archival recording and later processing.

Typically, a seismic cable may be 3000 to 4000 meters or more long. It may contain as many as a thousand individual data receiver channels. To avoid the need for thousands of separate wire lines, digital modules are mounted in the seismic streamer cable at intervals of 100 to 150 meters. Each module receives analog data from respective ones of a plurality of receivers, digitizes the analog signals and multiplexes the resulting digital signals back to the ship over a single wide-band transmission link of any desired type. Electrical power for activating the digital modules is transmitted from the ship over a suitable power line in the cable for distribution to the respective modules.

A seismic streamer cable is usually made up of many sections, each 100 to 150 meters long. A section consists of a PVC jacket about 5 cm in diameter. The seismic receivers, data-communication channels, power lines, command lines and the like are mounted inside the cable. The digital modules are usually designed to mechanically and electrically interconnect together respective ones of the plurality of individual cable sections as well as to pre-process the received seismic signals. Because the above-described hardware is heavy, the PVC jacket is filled with a lightweight fluid such as odorless kerosene to render the cable sections neutrally buoyant with respect to the average sea water density.

A streamer cable is long and flexible. Its configuration in three axes must be known. Although the location of the head end of the cable is known, the effects of wind and sea currents may cause other parts of the cable to wander away from a desired line of survey by a substantial distance. Thermoclines and local changes in seawater density may cause the cable to erratically sink or rise to undesired depths. Therefore, configuration-monitoring and controlling means are provided in the cable.

Three-dimensional cable configuration may be monitored with the aid of an instrumented tail buoy in combination with a number of three-axis sensing modules such as disclosed in U.S. Pat. No. 5,105,548 for an Apparatus for Determining Azimuth, Pitch and Roll, issued Apr. 21, 1992 to John T. Fowler and a Digicourse advertisement taken from the September 1993 issue of *The Leading Edge*. A tail buoy may include some form of geo-location equipment such as a GPS receiver. The sensing modules may include digital compasses for measuring local cable orientation and pressure-actuated depth sensors for measuring and reporting the local cable depth. The modules are mounted in the cable at selected intervals therealong such that the sinuosity of the cable can be accurately tracked.

The cable depth may be controlled by means of a module having pressure-actuated or servo-actuated diving planes. A number of control modules, also commonly referred to as Birds, are rotatably secured to the seismic cable at intervals therealong. The birds each include comparator means that may be preset to cause the bird to fly at a preselected depth. One such device is disclosed in U.S. Pat. No. 3,931,608, issued Jan. 06, 1976, to Jimmy R, Cole. The depth controller may of course be combined with the cable-configuration monitor as above described. The '608 patent also teaches a method for securing the modules to the cable using rotating attachment rings.

Navigation information from the tail buoy, the compasses, the depth sensors and commands to the depth controllers is transmitted bi-directionally between the towing ship and the cable-mounted sensors over a dedicated communications line. Information is typically encoded and transmitted using phase-shift-keying (FSK) over a 25-kHz carrier. Instrumentation signals from the respective modules are coupled into the communications line with the aid of an induction loop in the module that is associated with a mating induction coil mounted in the cable near the module attachment rings.

A seismic streamer cable complete with all of the accessories as enumerated is very expensive, on the order of a million dollars or more. In the event of a catastrophe such as the cable being snagged on an obstruction or cut by the screws of a passing ship, or damaged by reason of an excessive depth, it is prudent and economical to recover the remanent(s) of the cable for repair. Since the cable is normally neutrally buoyant, it does not necessarily surface after being cut. In fact when it has been cut, the jacket of the cut section loses its ballast fluid so that the cable remanent sinks.

There are devices available commercially for retrieving a damaged cable section. One such device is described in U.S. Pat. No. 4,541,079, issued Sep. 10, 1985 to Ben B, Thigpen. Here, a $CO_2$ cartridge is provided in selected cable sections. If the cable becomes damaged, an operator on the towing ship causes an alarm signal to be transmitted through the water to a responder associated with the damaged section and to other nearby sections. Upon receipt of the alarm signal, the cartridge is fired to release the gas and inflate the cable jackets of the one or more nearby undamaged sections. The inflated section then floats to the surface. The problem with that system is that it requires operator input. If the operator is unaware of the existence of cable damage, the damaged cable is lost and gone forever.

U.S. Pat. No. 4,823,325, issued Apr. 18, 1989 to Jimmy R. Cole Jr, teaches a cable retriever that uses an inflatable bag to lift the streamer to the water surface. An acoustical signal or a pressure switch activates the device and inflates the bag. An electric drill is used to puncture the frangible disk that seals the $CO_2$ cylinder. Although the triggering device is self-actuating when the cable exceeds a safe depth limit, in shallow water, the cable my never exceed the depth limit so that the retriever would not activate. Furthermore, the need for an electric drill complicates the system and adds weight. Additionally, the steel $CO_2$ bottle interferes with magnetic sensing devices.

The three types of devices that were discussed above are customarily hung on the seismic streamer cable at various locations therealong. Because the devices are heavy, each must include its own ballast. A plurality of modules hanging outboard of the cable create a clutter of hardware that increases the required towing force and substantially increases the ambient tow noise that is superimposed upon the relatively weak seismic signals.

There is a need for a single compact utility module for use with a seismic cable that includes the combined features of a multi-axis configuration-monitoring system, a depth controller, a module-floatation means and a self-activating cable retriever. The utility module including the cable retriever must be free from stray magnetic fields that would interfere with the magnetometer-type sensing device that is incorporated with the configuration-monitoring system. Once initialized, the damage-control system operation must be independent of any further need for operator input.

SUMMARY OF THE INVENTION

This invention provides a utility module, characterized by a vertical buoyancy differential, that incorporates a seismic streamer cable configuration-monitoring unit and a depth-control unit, in combination with a cable retriever unit. The utility module, secured to the streamer cable, is rotatable about the longitudinal axis of the streamer cable. A buoyancy member, included with the cable retriever, comprises a compartmented enclosure, a first compartment of which contains floatation material. A second compartment, having frangible walls, contains a normally deflated inflatable member. A non-magnetic gas source is in fluid communication with the deflated inflatable member. A first programmable pressure-sensitive triggering means actuates the gas source to inflate the inflatable member when the utility module exceeds a preselected operating depth. A second programmable time-delay triggering means actuates the gas source to inflate the inflatable member following the elapse of a preselected time delay following the occurrence of a preselected event.

In accordance with an aspect of this invention, the first and second triggering means may be selectively electrically coupled to a pyrotechnic squib-operated gas-release device that is operatively coupled to the gas source.

In accordance with another aspect of this invention, the pressure-sensitive means and the time-delay triggering means are programmable in response to an encoded command signal.

In accordance with this invention, a compartment in the utility module includes means for receiving and decoding transmitted command signals for reprogramming the pressure-sensitive and the time-delay triggering means.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention.

DETAILED DESCRIPTION OF THE PREFERRED EMBODIMENT

Figure 1:
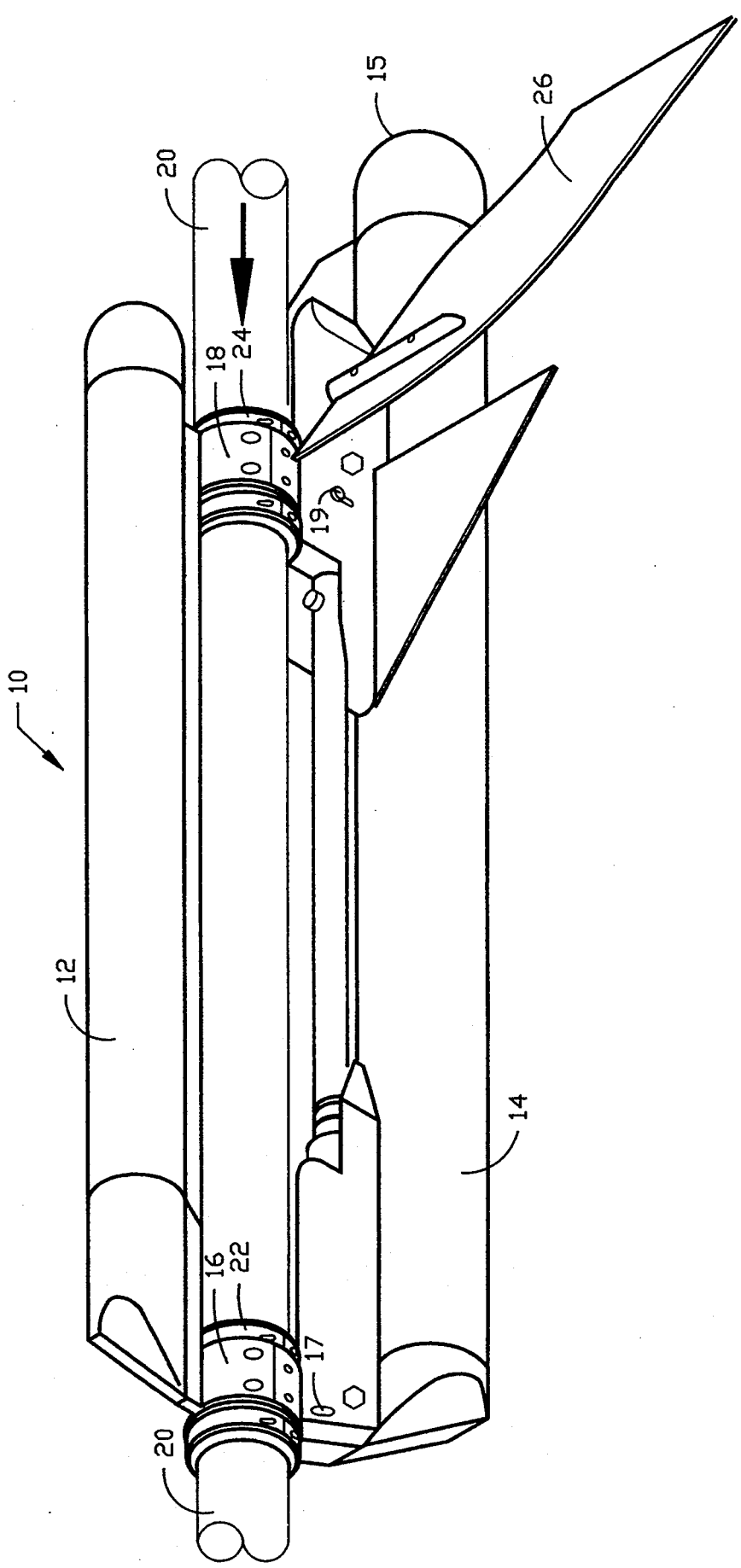
FIG. 1 is an isometric view of the utility module of this invention.

FIG. 1 is an isometric view of the utility module of this invention. The utility module 10 consists of a buoyancy member/cable retriever unit 12, a depth control device 14, the tail end, 15, of which contains a three-axis cable configuration-monitoring system. Depth control device 14 such as the device described in the '608 patent, is secured to rotatable rings 16 and 18 by latching cams 17 and 19 such as described in the '325 or '608 patents. Rings 16 and 18, preferably brass, naval bronze or plastic such as Lexan, rotate in suitable collars 22 and 24 that are clamped around seismic streamer cable 20. Wings such as 26, whose attack angle is controlled by a well-known internal pressure comparator (not shown) cause utility module 10 to fly at preselected depth as set by the operator. It is assumed that the seismic streamer cable is being towed from right to left in the drawing. The forward end of the utility module is tapered so that is will not become snagged.

The cable retriever member 12 is secured to rings 16 and 18 by latching cams (not shown in FIG. 1) on the opposite side of the rotatable rings, preferably above the depth controller 14. Member 12 is about 10 cm in diameter and over 1 meter long. As will be shown in connection with FIG. 2, member 12 consists of a number of compartments. A first compartment, occupying nearly one third of its length at the rear of member 12, forms a buoyancy compartment that is filled with a lightweight cellular material such as Klegecell Q100, a trademark of Klegecell Division of Hutchinson Group of Grapevine, Tex. The volume and mass of member 12 is such that it provides sufficient buoyancy to render the entire utility module at least neutrally buoyant and preferably to provide about 2.5 kg of net positive buoyancy to utility module 10. Furthermore, since cable retriever member 12 it much lighter than depth controller member 14, a vertical buoyancy differential is provided so that the ring-mounted utility module 10, taken as a whole, rotates with member 12 riding above the longitudinal axis of streamer cable 20.

Figure 2:
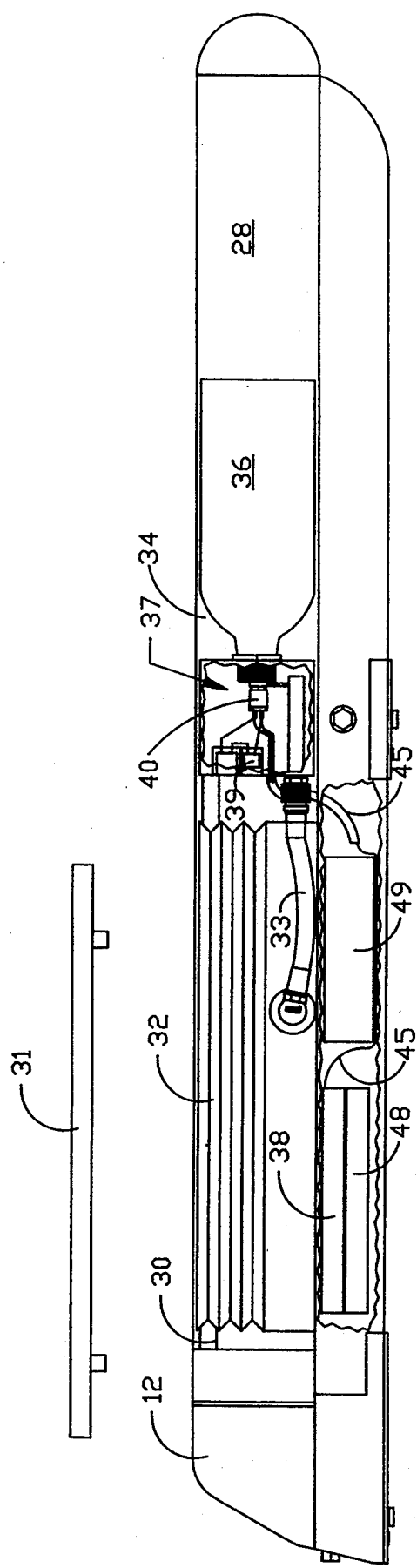
FIG. 2 is a cross-sectional side view of the retriever module.

Referring now to FIG. 2, only the details of cable retriever unit 12 will be considered. The details of depth controller 14 and cable configuration-monitor 15 are well known from the two patents that were cited earlier and thus per se, is not germane to this invention. For simplicity, we shall refer to member 12 simply as a retriever.

Cable retriever 12 includes several compartments. A first, or floatation compartment 28, is filled with the Klegecell material described earlier.

Compartment 30 forms a second compartment that is used to store a normally deflated inflatable bag 32. One preferred type of inflatable bag is supplied by Rocket Research of Redmond, Wash. who make air bags for use in automobile safety devices, an adaptation of which may be used for underwater devices such as disclosed in this invention. Compartment 30 has a frangible wall 31 that becomes dislodged under the force generated by bag 32 when and if it is inflated.

Compartment 34 contains the gas source 36 which may be a $NaN_3$ generator such as made by Rocket Research or it may be a non-magnetic aluminum bottle charged with $CO_2$ as furnished by Parker Hannifin Corp. of Eastlake, Ohio. Gas source 36, if it is a $CO_2$ bottle, is operatively coupled to inflatable member 32 through a squib-actuated valve 37. Squib 40 is electrically detonated in response to a triggering pulse from either a programmable pressure switch 39 or a time-delay clock in a microprocessor 38 (to be discussed later in connection with FIG. 4). The squib is of a type such as P/N071045-1 made by Cartridge Actuated Devices Inc. of Fairfield N.J. When triggered, $CO_2$ gas escaping from gas source 36 flows into normally deflated member 32 through suitable tubing 33. As member 32 becomes inflated, it dislodges frangible wall 31 and emerges from compartment 34 to expand to a volume of at least 0.06 $m^3$ when immersed in the water at the pre-programmed pressure depth.

Figure 3:
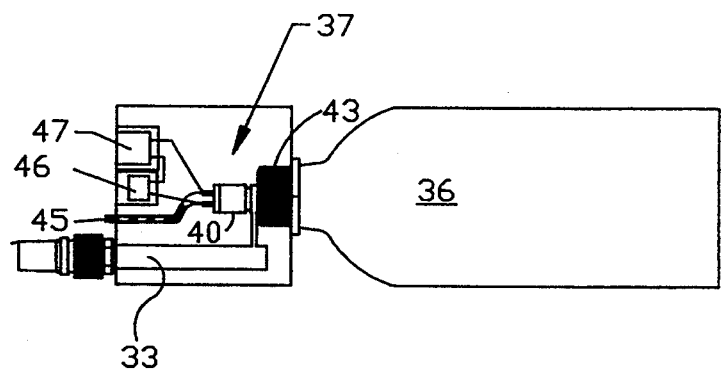
FIG. 3 is an enlarged view of the squib-activated gas-release valve.

The valve assembly 37 is shown in enlarged detail in FIG. 3. It consists of a squib-actuated gas-release device 40 coupled to a valve collar 43 that is screwed into the neck of the gas bottle 36. Tubing 33 provides a fluid passageway from collar 43 to member 32 when the valve assembly is activated. As earlier stated, the valve fires if the cable and retriever exceed a safe depth or upon the occurrence of a selected event such a severing of the cable but followed by a pre-selected time-out period. A twisted wire pair 45 couples the electronics package with squib 40, programmable pressure switch 46 and squib battery 47.

Figure 3A:
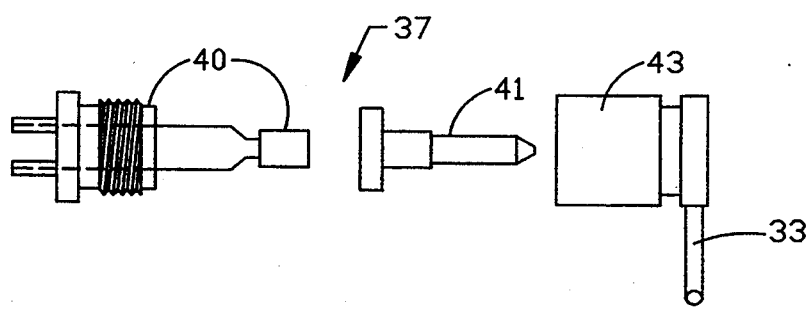
FIG. 3A is an exploded view of the squib triggering device.

FIG. 3A illustrates the parts of the squib-actuated valve assembly 37 which includes the explosive squib, 40, itself which, when fired drives a lance 41 into a diaphragm (not shown) mounted inside collar 43 in a conventional manner.

Figure 3B:
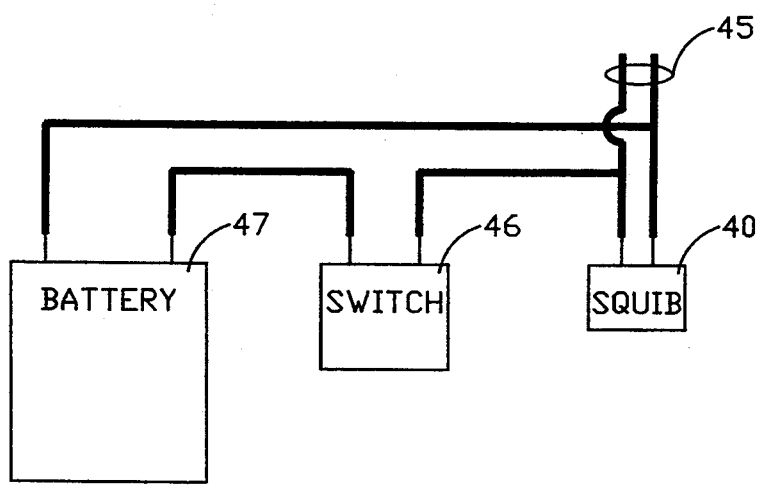
FIG. 3B is the electrical circuitry for controlling selective firing of the squib.

FIG. 3B shows the wiring diagram for actuating valve assembly 37. If the retriever exceeds a preselected depth, depth switch 46, which may be of any well-known type, closes and fires the squib 40 independently of input signals from the retriever electronics 38 that may be received over twisted pair 45. If excessive depth is not a problem, then squib 40 may be fired under program control by retriever electronics 38 next to be described.

Compartment 34 also includes an electronics package 38 for receiving and acknowledging program command signals transmitted by an operator from the towing ship using FSK coding at a carrier frequency of 25 kHz, 1200 baud, ±500 Hz frequency deviation. Electronics package also monitors the communication activity between sensors in the cable and a shipboard control system. Battery pack 49 consisting of two D-type cells provides power to the electronics package 38. Battery pack 49 has a service life of about one year. Induction coil 48 provides electromagnetic coupling with a similar inductive coil (not shown) mounted in cable 20 just aft of the mounting ring 22 (FIG. 1). The coil in cable 20 is electrically connected to shipboard electronics via twisted wire pair as is well known to the art.

The cable retriever system electronics as a whole consists of (1) A shipboard-mounted control system for sending control signals to the retrievers and for receiving retriever status information for operator monitoring. (2) a microprocessor communications and command unit mounted in each of the respective retrievers and (3) A hand-held communication unit that may be used for pre-programming the retriever units during deployment thereof. Each one of the components is individually powered by suitable batteries. Since all of those units are of similar design, only the retriever unit next will be described in detail.

Figure 4:
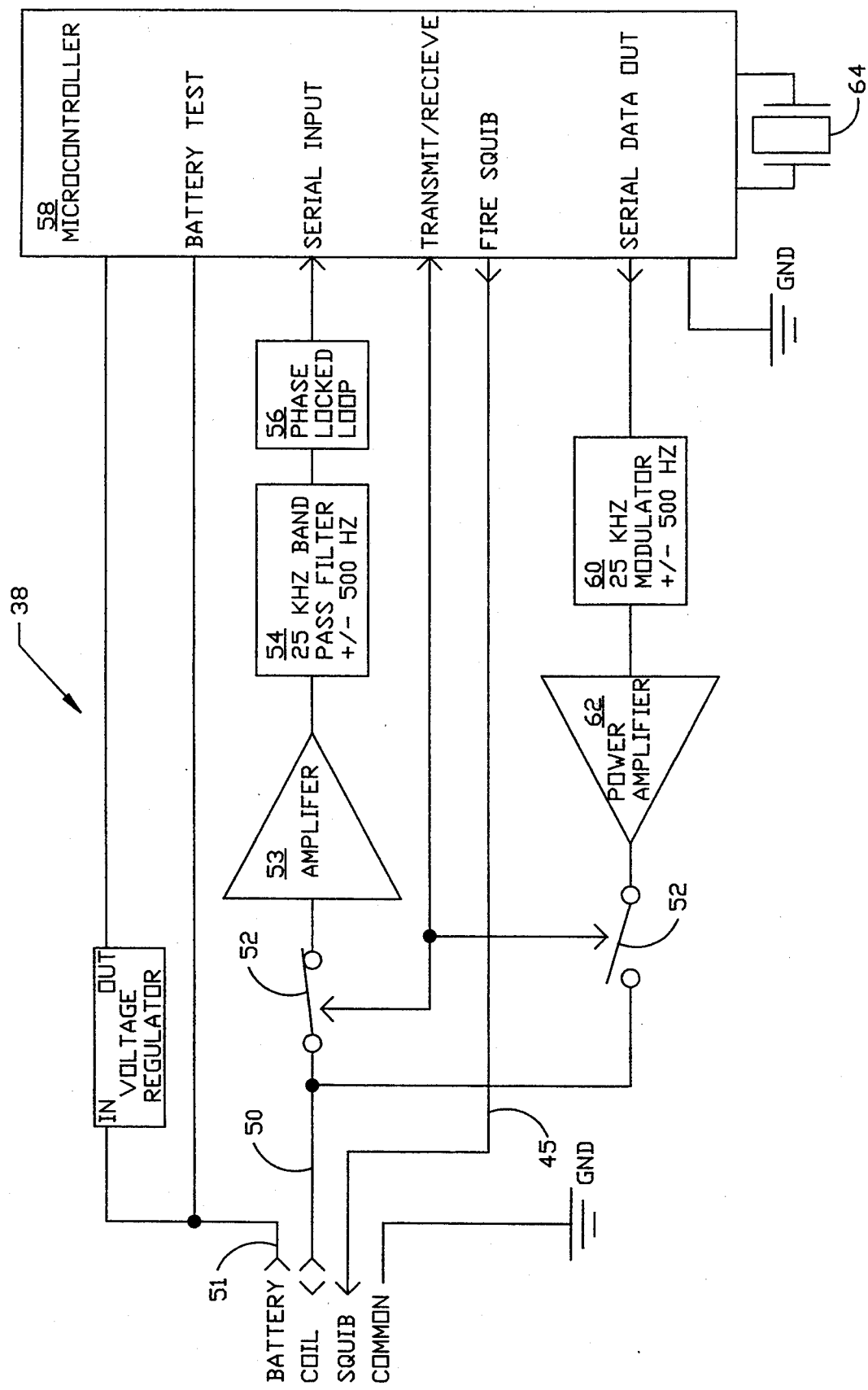
FIG. 4 is a block diagram of the retriever electronics.

FIG. 4 is a block diagram of the retriever electronic module 38. Bi-directional communication between the shipboard control unit and the retriever electronics 38 is handled over line 50 which is coupled to the inductive pickup coil 48 (FIG. 2). Battery power is supplied over line 51 from battery pack 49. Firing commands are output to squib 40 over line 45. Function switch 52 determines whether the unit transmits or receives. Function switch 52 is shown as separate units for clarity but are actually OR'ed together in a single unit.

The inductive coil 48 is coupled with a parallel resonance circuit to increase the circuit Q and to function as an inherent band pass filter. In the receive mode, switch 52 is followed by a coupling amplifier 53 and an active band pass filter 54. The signal is detected by a low power phase locked loop 56. The output of the phase locked loop is the actual detected frequency deviation corresponding to the transmitted data. The discrete data signal is passed to microprocessor 58 which receives and digests incoming commands and in response thereto, controls performance of required activities. Microprocessor 58 also is responsible for time keeping and goes into a low power sleep state when there are no communications expected. It monitors the presence of communications activities through the cable 20. To send discrete data back to the shipboard control unit, the input side of switch 52 is opened and the output side is closed. Data pass from the microprocessor 58 through 25-kHz modulator 60. The modulated data are amplified by power amplifier 62 and pass out through inductive coupler 48. Oscillator 64 provides the carrier for encoding the outgoing data.

The shipboard control unit and the hand-held programming units are of substantially the same design as the retriever electronics module 38 except that those units include a keypad coupled to the microprocessor for introducing program commands and an LCD for polling and displaying the status of the retriever status.

In operation, there are two scenarios in view of which the cable retriever 12 will be actuated: (i) When the cable or a portion thereof exceeds a pre-selected safe water depth, the retriever will immediately activate itself without delay. (ii) During normal operations, there is always chatter on the communications line due to the various sensors reporting their current status. Therefore, a sudden lack of communications activity would suggest that the cable has been cut or damaged. However, a dearth of activity might merely mean that the system has temporarily been shut down for maintenance. Therefore, a time delay function is programmed into the retriever electronics so that the retriever is not activated prematurely. A delay of up to 24 to 48 hours may be selected if desired. Thus, a first triggering means inflates an inflatable member 32 when the retriever exceeds a preselected depth. A second triggering means causes the inflatable member 32 to become inflated following a pre-selected time delay after the occurrence of a preselected event such as cessation of communications.

As the cable is being payed out from the mother ship, a plurality of retrievers are installed in sequence to the cable at desired intervals. When the installation is complete, the operator issues a command to set the desired time-out period before a retriever will fire. The control unit will interrogate each retriever in succession on the streamer cable, or on each cable if multiple streamer cables are deployed. Upon completion of the interrogation, the shipboard electronics compiles a report of the status of each retriever.

Figure 5:
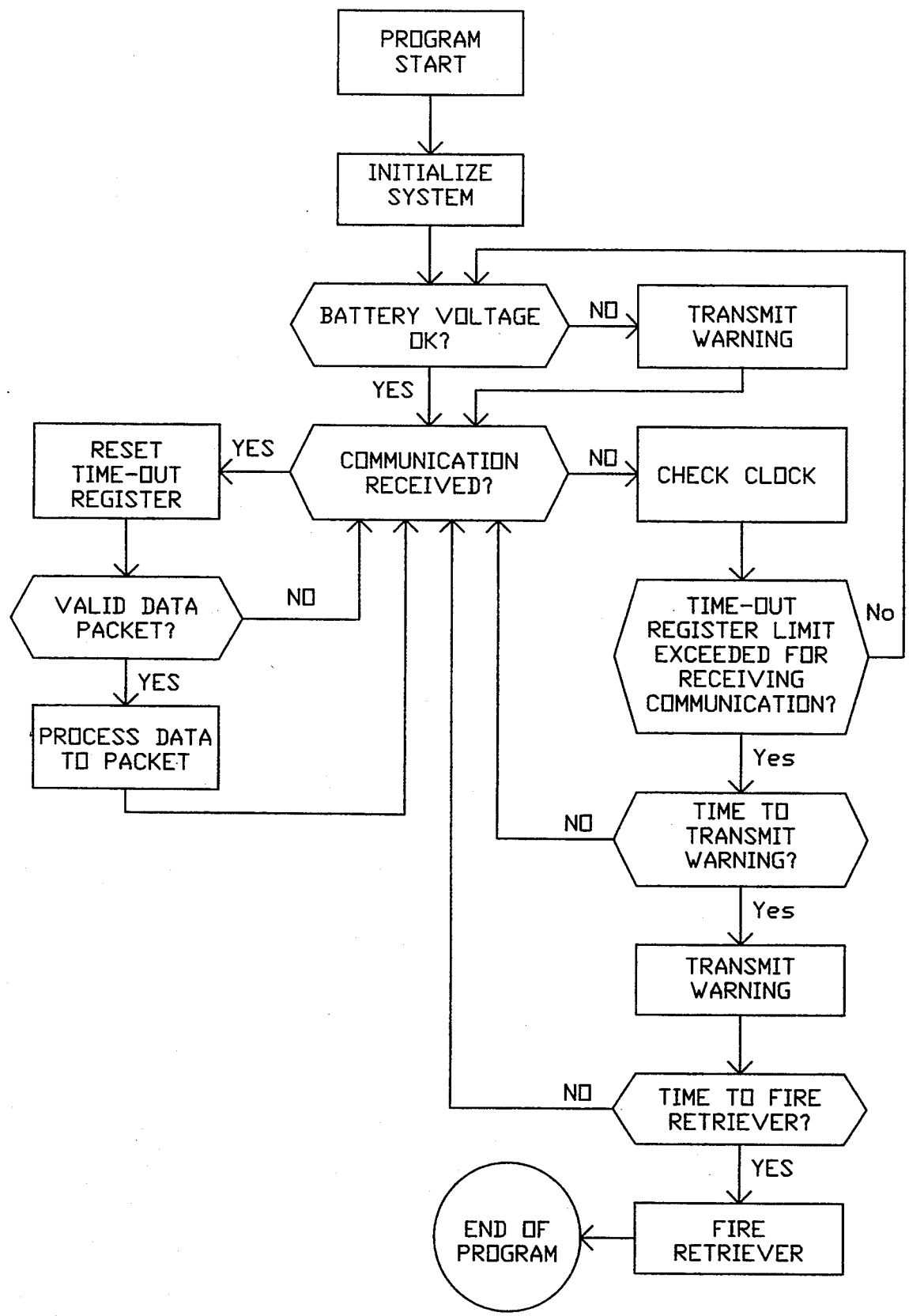
FIG. 5 is a flow chart of the overall system control.

With reference to the flow chart of FIG. 5, Following the status report, the system is initialized by sending a sync command to all of the retrievers to synchronize all of the respective internal clocks. At the same time, each retriever is assigned a sequence number for time-division multiplexing of communications so that no two retrievers will attempt to talk at the same time.

In the event that one or more retrievers decides to fire because of cessation of communications as indicated at the "Communications Received?" decision point, a message will be sent continuously back to the ship warning of a contemplated action to be taken by a retriever. The operator can then inhibit the retriever from taking action and restart the count-down sequence as shown at the "Reset Time-Out Register". If, on the other hand, the streamer cable had actually been cut, the operator would never have received the warning; the retriever would then perform its ordained function upon the completion of the pre-programmed count-down period. By way of example but not by way of limitation, the time-out warning period might be four hours. In the circumstance of an untoward event such as an excessive depth submergence in combination with a severed cable, immediate operation of the pressure switch to inflate the bag takes precedence over the delayed operation of the time-out operational sequence.

The electronics section 38 may be programmed and interrogated using any desired encoding sequence. For example but not by way of limitation, a coded command signal in hexadecimal format might take the form 7E 7E aa bb cc dd where 7E 7E is the command header, aa is the specific-action ident such as "set pressure switch", bb is a unit address, cc is a datum value such as the preselected pressure setting to be introduced to the programmable pressure switch and dd is the checksum. Individual units may be addressed or a global command may issue. Table 1 lists the retriever command protocol.

To avoid communication interference between retrievers, the time clocks are synchronized as previously explained. Each retriever is assigned a unique address which determines the time schedule that a particular retriever is enabled for broadcasting. A broadcast interval starts every 20 minutes with the first interval starting at the next 20-minute boundary from the retriever reset. The 20-minute interval is divided into 255 4-second time slots. The 255 time slots correspond to the 255 available retriever addresses. That number of addresses is needed in order to accommodate multiple-cable configurations. Each retriever address is assigned a unique time slot. The retriever has up to 4 seconds to broadcast its message within the assigned time

TABLE 1

Retriever Command Protocol

| Command | Description | Response | Description |
| --- | --- | --- | --- |
| 7E 7E 00 aa bb | Reset retriever. Where "aa" is the retriever address. When "aa" = FF, all retrievers are addressed. "bb" is the checksum. | 7E 7E 10 aa bb cc | Command Acknowledged. Self test performed with results in "aa". Unit address is in "bb". Check sum in "cc". |
| 7E 7E 05 aa bb cc dd | Set Time-out. Where "aa" and "bb" is the time in minutes, "cc" is the unit address, and "dd" is the checksum. | 7E 7E 15 aa bb cc dd ee ff | Command acknowledged. Where "aa" and "bb" are the last programmed time-out "cc" and "dd" is the new time-out "ee" is the unit address, and "ff" is the unit check sum. |
| 7E 7E 06 aa bb | Return battery power. Where "aa" is the unit address, and "bb" is the checksum. | 7E 7E 16 aa cc dd | Command Acknowledged. Where "aa" is the battery voltage in 5 mV increments, "cc" is the unit address, and "dd" is the checksum. |
| 7E 7E 07 aa bb | Arm retriever. Where "aa" is the unit address, and "bb" is the checksum. | 7E 7E 17 aa bb cc | Command Acknowledged. Where "aa" was the last state (armed = 01, disarmed = 00), "bb" is the present state, and "cc" is the command checksum. |
| 7E 7E 08 aa bb | Synchronize internal clock. Where "aa" is the unit address, and "bb" is the checksum. | 7E 7E 18 aa bb cc dd | Command Acknowledged. Where "aa" is the last command received. "bb" is the status error code, "cc" is the unit address, and "dd" is the checksum. |
| 7E 7E 09 aa bb cc | Command broadcast by retriever to indicate an about to fire state. Where "aa" is the unit address, "bb" is the time remaining in 5 minute intervals, and | N/A | |

TABLE 1-continued

Retriever Command Protocol

| Command | Description | Response | Description |
| --- | --- | --- | --- |
| 7E 7E 0A aa bb | "cc" is the checksum. Last Command received inquiry. Where "aa" is the unit address, and "bb" is the checksum. | 7E 7E 1A aa bb cc dd | Command Acknowledged. Where "aa" is the last command received. "bb" is the status error code, "cc" is the unit address, and "dd" is the checksum. | slot before yielding to the next time slot. Under normal circumstances, a retriever will require less than 0.5 second to broadcast its message. The remaining time allows for responses from the shipboard control unit and also allows for long term drift between retriever interval timers.

This invention has been described with a certain degree of specificity by way of example only and not by way of limitation. This invention is limited only by the appended claims.

What is claimed is:

1. In combination with a multi-axis streamer-cable configuration-monitoring and control module mounted on a seismic streamer cable from a supporting ring that is rotatable about the longitudinal axis of said seismic streamer cable, a cable retriever system, comprising:
   an enclosure, said enclosure being fastened to said supporting ring oppositely from said configuration-monitoring and control module;
   a floatation compartment in said enclosure;
   at least a second compartment in said enclosure for containing a normally-deflated inflatable member, said second compartment including a frangible wall;
   non-magnetic gas supply means in fluid communication with said normally-deflated inflatable member;
   first triggering means for causing said gas supply means to inflate said normally deflated inflatable member when said cable retriever exceeds a preselected water depth; and
   second alternative triggering means for causing said gas supply means to inflate said inflatable member after the elapse of a preselected time delay following the occurrence of a preselected event.

2. The cable retriever system as defined by claim 1, wherein:
   said gas supply means is a solid-chemical gas generator.

3. The cable retriever system as defined by claim 1, wherein:
   said first triggering means is a programmable depth sensitive switch that may be preprogrammed to cause said gas supply to inflate said normally-deflated inflatable member at a preselected water depth.

4. The cable retriever system as defined by claim 1, wherein:
   said floatation compartment in said cable retriever is sufficiently buoyant to render said configuration-monitoring and control module in combination with said cable retriever considered as a whole, neutrally buoyant in a body of water and to create a vertical buoyancy differential sufficient to cause said cable retriever module to rotate so as to remain uppermost with respect to the configuration-monitoring and control module and the streamer cable to which the combination is secured.

5. The cable retriever system as defined by claim 1, wherein:
   said normally-deflated inflatable member, when inflated, provides positive buoyancy substantially in excess of the dead weight of a streamer cable section when said inflatable member sinks to a preselected pressure-depth region in said body of water.

6. The cable retriever system as defined by claim 1, comprising:
   communication line means in said seismic streamer cable for transmitting encoded command signals from a shipboard control unit to said cable retriever for setting a preselected water-depth limit in said first programmable triggering means and for setting a preselected time delay in said second programmable triggering means;
   means in said retriever for receiving and decoding said command signals and for introducing the decoded command signals to the respective first, and second alternative, programmable triggering means for enabling the functional operation thereof in accordance with the command-signal specifications.

7. The cable retriever system as defined by claim 1, wherein:
   said at least one preselected event is a communications failure in a communications line in said seismic streamer cable.

8. The cable retriever system as defined by claim 7, wherein:
   the operation of said first triggering means takes precedence over the operation of said second alternative triggering means in the presence of an untoward event.

9. The cable retriever system as defined by claim 1, wherein:
   said source of gas includes a non-magnetic bottle for containing a gas under pressure.

* * * * *